Nov. 4, 1952   B. B. HOLMES   2,616,442
RESPIRATORY DEVICE
Filed June 18, 1946   3 Sheets-Sheet 1

INVENTOR
BRADFORD B. HOLMES
BY
ATTORNEY

Nov. 4, 1952   B. B. HOLMES   2,616,442
RESPIRATORY DEVICE
Filed June 18, 1946   3 Sheets-Sheet 2

INVENTOR
BRADFORD B. HOLMES
BY
ATTORNEY

Nov. 4, 1952  B. B. HOLMES  2,616,442
RESPIRATORY DEVICE

Filed June 18, 1946  3 Sheets-Sheet 3

INVENTOR
BRADFORD B. HOLMES
BY
ATTORNEY

Patented Nov. 4, 1952

2,616,442

UNITED STATES PATENT OFFICE 2,616,442

RESPIRATORY DEVICE

Bradford B. Holmes, New York, N. Y., assignor to Bendix Aviation Corporation, Teterboro, N. J., a corporation of Delaware Application June 18, 1946, Serial No. 677,597

5 Claims. (Cl. 137—157)

This invention relates to respiratory devices and more particularly to a selective control for the demand valve of a diluter demand oxygen regulator.

The oxygen requirements of man in flights over the 10,000 feet level must be supplemented by artificial means to avoid the adverse physiological reactions due to an anoxia. Various types of oxygen breathing apparatus have been devised to supply the required oxygen at high altitudes. Of particular importance are the diluter demand oxygen regulators in which the air is mixed with oxygen and delivered to the mask of the user as required.

Such type of regulators rely upon the actuation of a respiratory responsive diaphragm to open and close a demand valve in the oxygen supply line. The suction required of the user to operate the demand valve is approximately equal to one-fourth inch of water pressure. The oxygen supply for these regulators is usually carried in tanks under pressure of from 500 to 1800 pounds per square inch. The oxygen pressure must first be reduced before the oxygen is mixed with the air. This is done by a reducer valve in the regulator which is opened and closed by means of a pressure responsive member within a reducing chamber. The oxygen pressure is here reduced to approximately 55 pounds per square inch. From the reducing valve and chamber, the oxygen passes to the demand valve which permits the oxygen to flow in accordance with the demand of the regulator user. From the demand valve the oxygen enters a venturi through a jet or nozzle, the velocity of the oxygen entraining the air which is present in the Venturi passage. The mixture ratio of the two gases is adjusted by a diluter valve through which the air enters the Venturi passage within the regulator.

Due to the supply of oxygen delivered to the mask by the operation of the demand valve, the pressure within the reducing chamber is decreased. When the pressure within the reducing chamber reaches a predetermined low pressure the pressure responsive element contained therein will actuate the reducing valve to permit the oxygen under pressure to again enter said chamber. Upon the increase in the pressure of the chamber to approximately 55 pounds per square inch, the reducing valve is again closed until the aforesaid cycle of operation is repeated.

A regulator of the type described is disclosed in my co-pending application bearing Serial No. 482,016, filed on April 6, 1943.

In sustained flights over the 10,000 foot level but below the 25,000 foot level, the oxygen supplied to the mask by the average regulator has a pressure of approximately −0.25 inch of water. This oxygen requirement is normally sufficient for the average person. At the 25,000 foot level, and above, the pressure of the oxygen delivered to the regulator user must increase if anoxaemia is to be avoided, due to the decrease in oxygen content of the air and the resultant fall of oxygen partial pressure in the inhaled air. If the alveolar tension is to be maintained at a safe level means must be devised whereby the oxygen pressure delivered to the mask is increased.

It is therefore an object of my present invention to provide a selective control for the demand valve for an oxygen regulator which will exert a positive pressure upon the respiratory responsive diaphragm of said regulator to increase the oxygen pressure delivered by a regulator to the respiratory mask connected thereto.

Another object of this invention is to provide a selective control for the demand valve of a regulator which will exert a positive pressure of approximately one-fourth of an inch of water on the regulator diaphragm to insure positive oxygen pressure of approximately .25 inch water to the mask at an altitude of approximately 25,000 feet to prevent air leakage around the edges of the mask.

A further object of this invention is to provide a selective control for the demand valve of a regulator which shall exert a positive pressure up to 12 inches of water on the regulator diaphragm to enable the regulator to deliver oxygen to the mask at a pressure approximately equal to 12 inches of water to enable flights above 45,000 feet.

Still another object of this invention is to provide a selective control for the demand valve of a regulator which shall be simple in operation, relatively inexpensive to manufacture, positive in its action, and yet be practical and efficient to a high degree of use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the appended claims.

In the accompanying drawings, in which one of the various possible illustrative embodiments of the invention is shown, Fig. 1 is a plan view of a demand regulator with the selective control embodying this invention affixed thereto.

Fig. 3 is a cross-sectional view of the selective control for a demand valve embodying the present invention, while

Figure 1:
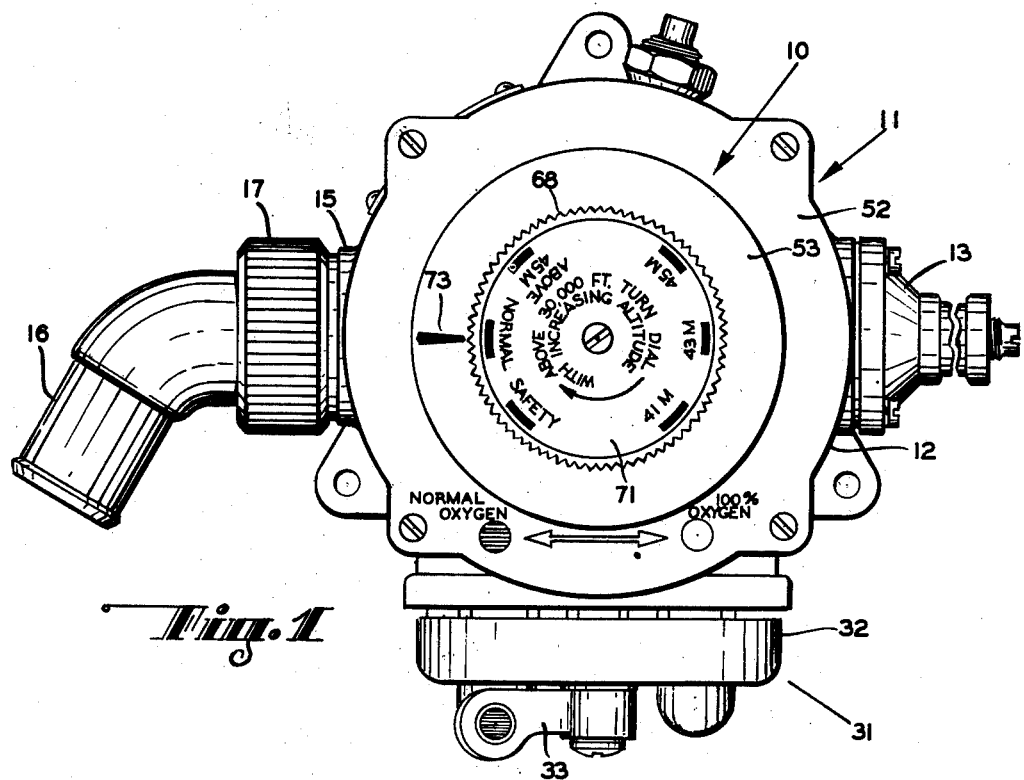
Figure 3:
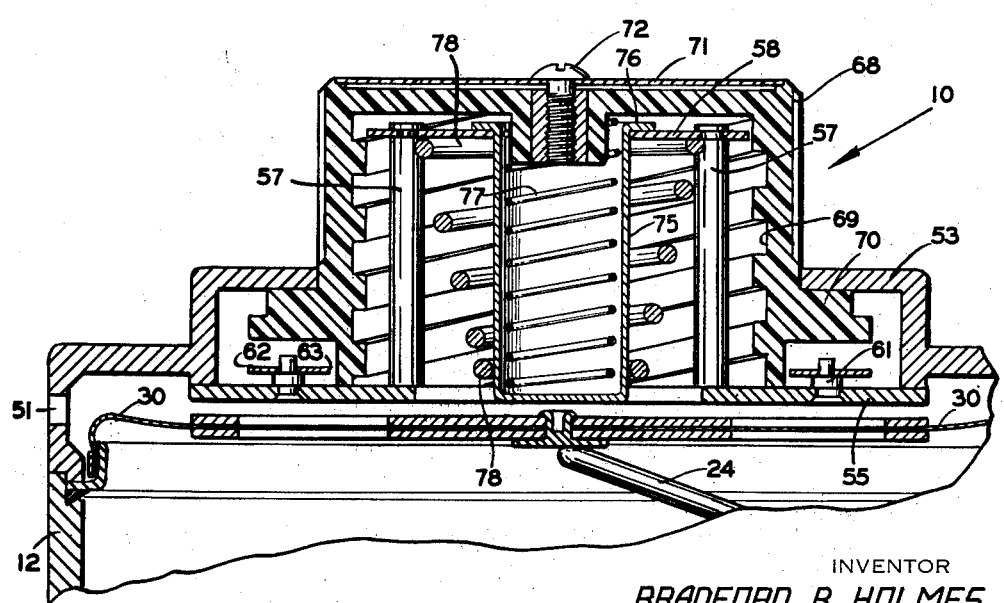

Referring in detail to the drawings, 10 designates a selective control embodying the invention incorporated on a regulator 11. The regulator 11 comprises a cylindrical body 12 formed with a boss 13 provided with an inlet 14, and a second boss 15 to which an outlet 16 is fastened as by a coupling 17. The inlet 14 is adapted to be connected to a supply of oxygen under pressure (not shown), while the outlet 16 is adapted to be connected by a hose line to a mask (not shown).

Figure 2:
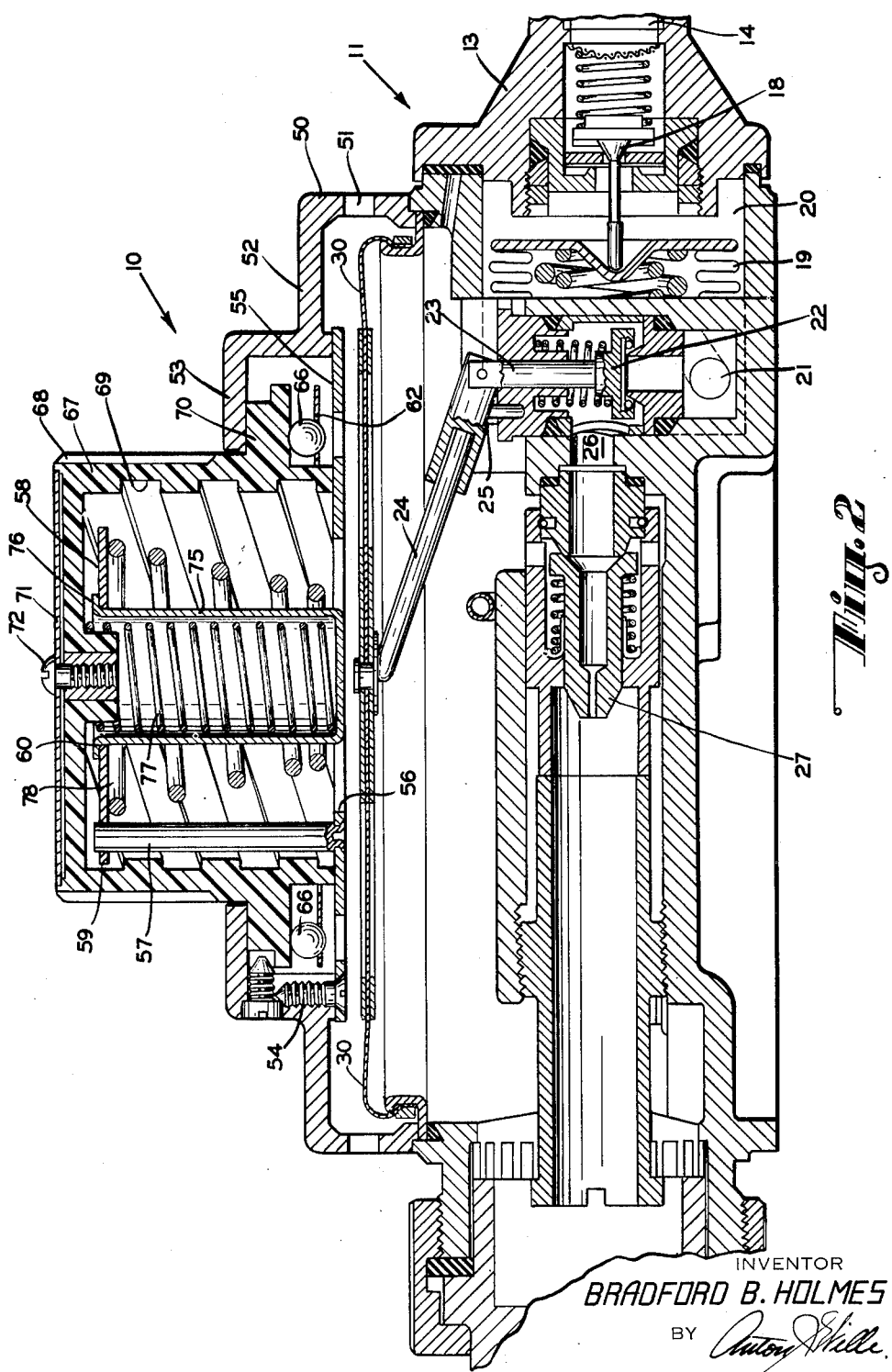
Fig. 2 is a sectional view of the demand regulator and selective control, portions thereof being broken away, and other portions shown in elevation.

The regulator 11 is provided with a reducing valve 18 (Fig. 2) in the inlet 14, said valve being actuated by a pressure responsive member 19 in a pressure reducing chamber 20 within the regulator body 12. The pressure reducing chamber 20 is connected by means of a line 21 to the inlet side of a demand valve 22. The demand valve 22 is provided with a valve stem 23, the upper end of which is pivoted to a lever 24. The lever in turn is pivoted about a fulcrum 25. A passageway 26 leads from the demand valve 22 to a jet or nozzle 27 placed in the mouth of a venturi 28.

The lever 24 is adapted to be rocked about its pivot point 25 by the actuation of a respiratory responsive diaphragm 30 fixed across the open end of the cylindrical body 12. The respiration of the mask wearer will actuate the diaphragm 30 to raise and lower the same, closing and opening the demand valve 22 to permit the oxygen to flow from the reducing chamber 20 to the jet nozzle 27.

A diluter assembly 31 (Fig. 4) is also provided for the regulator, and comprises a threaded portion 32 having a handle 33 adapted to be rotated to close the air ports 34 provided in said assembly. A chamber 36 is formed within said assembly and has disposed therein a pressure responsive member 37 adapted to actuate a plate valve 38. The plate valve 38 is adapted to abut the valve seat 40. The diluter assembly 31 is further provided with a check valve 41 adapted to be held in engagement with a valve seat 42 by the coil compression spring 43. The air entering the ports 34 of the assembly will flow through chamber 36 into the mouth of the venturi 28 to be there entrained by the oxygen under pressure flowing from the jet 27. Atmospheric pressure will actuate the member 37 to decrease the opening of valve seat 40 as the altitude increases.

The regulator 11 is further provided with an emergency valve 45 placed in the inlet line 14 and provided with a knob 46. The opening of the emergency valve 45 will permit the oxygen to flow from the inlet line 14 through the body of the regulator to the outlet line 16, by passing the valve mechanisms hereinbefore described.

Figure 4:
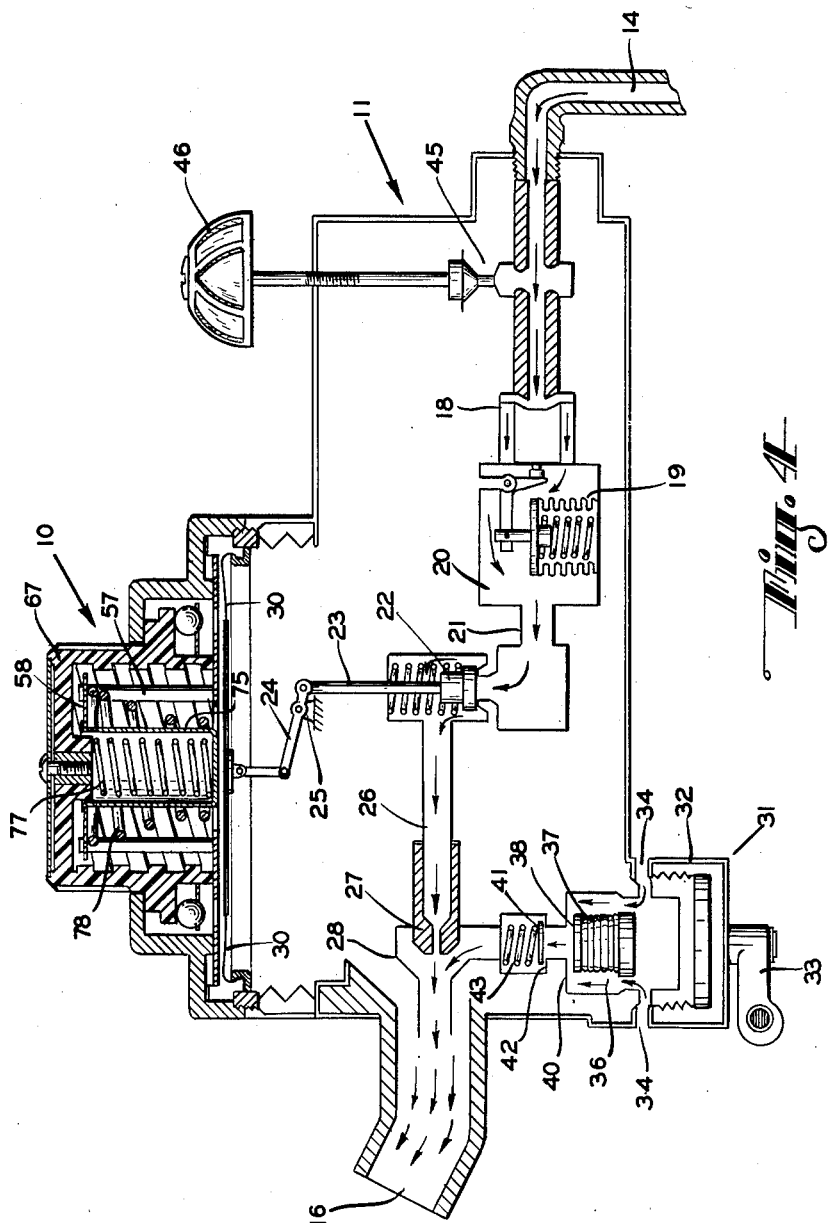
Fig. 4 is a schematic view of the demand regulator and selective control to illustrate the principles of operation.

It is believed that with the discussion herein given, taken together with the schematic of Fig. 4 and the arrow markings thereon indicating the flow of oxygen and air through the regulator 11, the operation of said regulator has been sufficiently described for an understanding of its operating principles. For a more detailed description of the apparatus and its operation, reference may be had to the aforesaid copending application.

Means is provided to exert a positive pressure on the diaphragm 30 to open the demand valve 22 to increase the pressure of the oxygen delivered to the outlet 16 leading to the mask.

To this end the selective control 10 is fixed over the top of the regulator 11 adjacent to the respiratory responsive diaphragm 30. The control 10 comprises a stepped annular member 50 provided with a plurality of air ports 51, and formed with two shoulder surfaces 52 and 53. Fixed within the member 50 and to the underside of the shoulder surface 52 by screws 54, is a circular plate 55 formed with a centrally disposed opening 56. Swedged to the plate 55 are three upright posts 57. Slidably received on said posts is a spider 58 formed with three radially disposed lugs 59 and provided with a centrally disposed opening 60.

Fixed to the plate 55, as by rivets 61, is a spring plate 62 formed with a centrally disposed opening 63 of comparatively large diameter and provided with a plurality of small openings disposed about the periphery thereof in which are positioned ball bearings 66. Supported on the bearings 66 is a setting knob 67 made of Bakelite or the like, and formed with a fluted outer surface 68, and an inner threaded surface 69. The setting knob 67 is provided with a shoulder member 70, said shoulder member being under the shoulder surface 53 of member 50, and pressed thereto by the action of the bearings 66 and spring plate 62. The setting knob 67 is further provided with a dial 71 fixed to the top thereof as by screws 72, and read in conjunction with an index 73 placed upon the shoulder surface 53. The knob 67 is thus provided with a bearing surface upon it and may be rotated, and a holding means for holding the same in place on top of the regulator 11.

The lugs 59 on the spider 58 are adapted to coact with the three square cut threads of the inner surface 69 of the knob 67. Rotation of said knob in one direction or the other will cause the spider 58 to travel up and down over the upright posts 57.

Received within the annular opening 60 of the spider 58, is a cylindrical cup-shaped member 75; the upper end of which is formed with a lip 76 which rests upon the upper surface of the spider 58. Vertically disposed within the cylindrical member 75 is a coil spring 77, the upper end of which abuts the underside of setting knob 67. The lower end of said spring rests in the bottom of the cup member 75. The tension of the spring 77 against the underside of knob 67 will hold the lip 76 in engagement with the spider 58.

Fixed to the underside of the spider 58 is a conical coil spring 78, said spring being placed about the cylindrical cup member 75. The lower end of said spring is free. Both the cylindrical cup member 75 and conical spring 78 are adapted to be moved downwardly through the annular opening 56 of the plate 55 to engage the diaphragm 30 of the regulator 11.

Rotation of the setting knob 67 in a clockwise direction will cause the spider 58 to be moved downwardly by the internal threads 69. The downward movement of the spider 58 will cause the cup member 75 to be moved downwardly due to the tension of the spring 77 against the underside of the knob 67. The conical spring 78 will also be moved downwardly by said spider. Due to the resilient coupling of member 75 to the spider 58, the actuation of the diaphragm 30 due to the respiration of the consumer will raise and lower the member 75. The positive pressure however, will always be maintained. From the drawings it is evident that the bottom edge of the cup 75 will engage the diaphragm 30 before the lower edge of the conical spring engages therewith. The further rotation of the setting knob 67 will cause the conical spring to engage the diaphragm 30 to increase the positive pressure thereon.

In the operation of the regulator 11 and the selective control 10, the parts are in the position shown in the drawings for operating from sea level to 25,000 feet. The respiration of the mask wearer actuates the diaphragm 30 to open and close the demand valve 22 with a suction of about one fourth inch of water. The oxygen pressure delivered to the mask under these conditions is approximately .25 inch of water. At 25,000 feet the knob 67 is rotated in a clockwise direction (Fig. 1) until "safety" registers with the index mark 73. The rotation of the knob 67 will lower the spider 58 causing the cylindrical cup member 75 to engage the diaphragm 30 with a slightly positive pressure. This positive pressure is approximately one fourth inch of water. The slight pressure on the diaphragm will offset the suction required of the user to deflect the same. Thus, upon inspiration of the user the demand valve 22 is quickly opened, and remains in a slightly opened and balanced, condition to permit the oxygen to flow from the line 21 into the line 26 leading to the jet 27. The oxygen is delivered to the mask at a pressure of approximately .25 inch of water. There is thus provided oxygen of positive pressure preventing air leakage around the mask.

The oxygen supplied under the safety breathing conditions described is sufficient up to approximately 38,000 feet. At this level, the water vapor becomes a serious factor. The knob 67 is given another turn to the next position indicated thereon. In this position of the knob the pressure of the cylindrical member 75 on the diaphragm is slightly increased due to the tension of the spring 77. However, the conical spring 78 is now brought to bear on the diaphragm 30. The resultant deflection due to the spring 78 will hold the demand valve 22 open. The oxygen may thus flow at a positive pressure through the demand valve 22 into the venturi 28.

With each succeeding turn of the knob 67, the pressure upon the diaphragm is increased; the positive pressure exerted on the diaphragm by the conical spring increasing to approximately 12 inches of water at 45,000 feet. The oxygen pressure delivered to the mask is then approximately equal to 12 inches of water.

In the discussion of the operation hereinbefore given of the control 10, the operation of the diluter assembly 31 has been avoided since its operation is automatic in view of the pressure responsive member 36 in cutting down the air supplied to the venturi 28. It will be understood by those skilled in the art that a greater percentage of oxygen is delivered to the mask as the altitude increases; 100 per cent oxygen being delivered at the 32,000 foot level, the pressure of the oxygen delivered being increased by the selective control above set forth.

It will thus be seen that there is provided an improved selective control in which the several objects of this invention are achieved and which is well adapted to meet the conditions of practical use.

As various possible embodiments might be made of the above invention, and as various changes might be made in the embodiment above set forth, it is to be understood that all matter herein set forth, or shown in the accompanying drawings, is to be interpreted as illustrative and not in a limiting sense.

Having thus described my invention, I claim as new and desire to secure by Letters Patent:

1. A selective control for a diaphragm comprising a plurality of posts, a spider slidably received on said posts, a rotatable setting knob receiving said posts and spider, an internally threaded surface in said knob cooperating with said spider for moving the same along said posts upon rotation of said knob, resilient means movable with said spider adapted to exert a positive pressure on a diaphragm, and a second resilient means fixed to said spider and adapted to be moved thereby to exert a positive pressure on a diaphragm sequentially to and then act concurrently with said first resilient means to increase the positive pressure thereon when said setting knob is rotated in one direction.

2. In an oxygen demand regulator having a demand valve controlled by a diaphragm, a selective control comprising a diaphragm, a plate adjacent to said diagram provided with a centrally disposed opening, a plurality of posts on said plate, a spider slidably received on said posts, a rotatable setting knob receiving said posts and spider, an internally threaded surface in said knob cooperating with said spider for moving the same along said posts upon rotation of said knob, resilient means movable with said spider adapted to be moved thereby through the opening in said plate to exert a positive pressure on said diaphragm, and a second resilient means fixed to said spider and adapted to be moved thereby through the opening in said plate to exert positive pressure on said diaphragm sequentially to and then act concurrently with said first resilient means to increase the positive pressure thereon as said setting knob is rotated in one direction.

3. In an oxygen demand regulator having a demand valve controlled by a diaphragm, a selective control comprising a diaphragm, a plate adjacent to said diaphragm provided with a centrally disposed opening, a plurality of posts on said plate, a spider slidably received on said posts, a rotatable setting knob receiving said posts and spider, an internally threaded surface in said knob cooperating with said spider for moving the same along said posts upon rotation of said knob, a centrally disposed opening in said spider, a cylindrical cup-shaped member slidably received within the opening in said spider, resilient means coupling said cylindrical cup member to said spider, said member being moved by said spider through the opening in said plate to exert a positive pressure on said diaphragm, and second resilient means fixed to said spider and adapted to be moved thereby through the opening in said plate to exert pressure on said diaphragm sequentially to and then act concurrently with said cylindrical cup member to increase the positive pressure thereon as said setting knob is rotated in one direction.

4. In an oxygen demand regulator having a demand valve controlled by a diaphragm, a selective control comprising a diaphragm, a plate adjacent to said diaphragm provided with a centrally disposed opening, a plurality of posts on said plate, a spider slidably received on said posts, a rotatable setting knob receiving said posts and spider, an internally threaded surface in said knob cooperating with said spider for moving the same along said posts upon rotation of said knob, a centrally disposed opening in said spider, a cylindrical cup-shaped member slidably received within the opening in said spider, resilient means coupling said cylindrical cup member to said spider, said member being moved by said spider through the opening in said plate to exert a positive pressure on said diaphragm, and a conical coil spring about said cylindrical member fixed at its base end to said spider and adapted to be moved thereby through the opening in said plate, the apex end of said spring exerting pressure against said diaphragm sequentially to and then acting concurrently with said cylindrical cup member to increase the positive pressure on said diaphragm as said setting knob is rotated to its extreme position in one direction.

5. In an oxygen demand regulator having a demand valve controlled by a diaphragm, a selective control comprising a diaphragm, a plate adjacent to said diaphragm provided with a centrally disposed opening, a plurality of posts on said plate, a spider slidably received on said posts, a rotatable setting knob receiving said posts and spider, an internally threaded surface in said knob cooperating with said spider for moving the same along said posts upon rotation of said knob, a centrally disposed opening in said spider, a cylindrical cup-shaped member slidably received within the opening in said spider, a longitudinally disposed coil spring within said cylindrical cup-shaped member, one end of said spring exerting pressure against the bottom wall of said member while the other end thereof exerts pressure against the underside of the setting knob to resiliently couple said member to said spider, said member being moved by said spider through the opening in said plate to exert pressure on said diaphragm, and a conical coil spring about said cylindrical member fixed at the base end to said spider and adapted to be moved thereby through the opening in said plate, the apex end of said spring exerting a positive pressure on said diaphragm sequentially to and then acting concurrently with said cylindrical cup-shaped member to increase the positive pressure on said diaphragm as said setting knob is rotated in one direction to its extreme position.

BRADFORD B. HOLMES.

REFERENCES CITED

The following references are of record in the file of this patent:

UNITED STATES PATENTS

| Number | Name | Date |
|---|---|---|
| 744,297 | Cook | Nov. 17, 1903 |
| 1,825,637 | Ricker | Sept. 29, 1931 |
| 2,406,888 | Meidenbauer | Sept. 3, 1946 |

FOREIGN PATENTS

| Number | Country | Date |
|---|---|---|
| 5,115 | France | of 1905 |